A. LATIMER.
PNEUMATIC TIRE.
APPLICATION FILED JUNE 8, 1907.
943,640.
Patented Dec. 14, 1909.
3 SHEETS—SHEET 1.
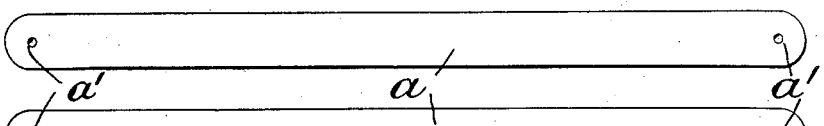
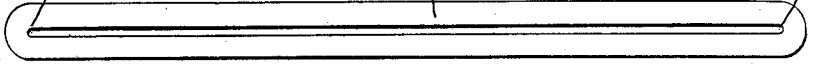
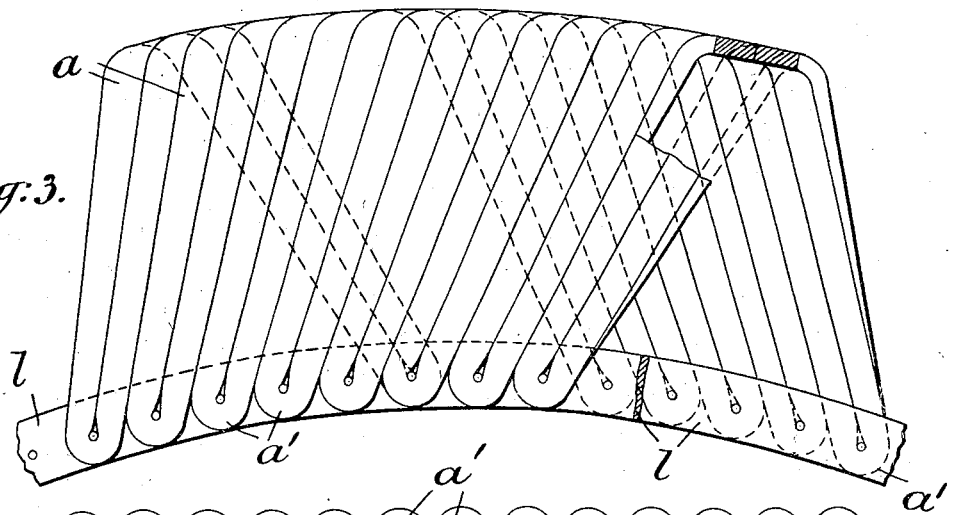
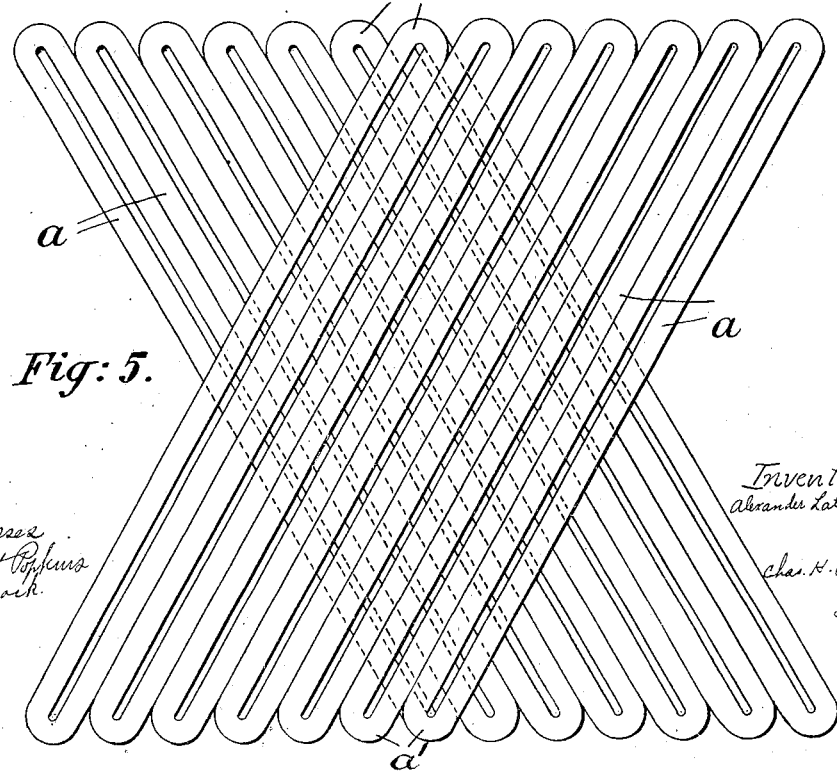

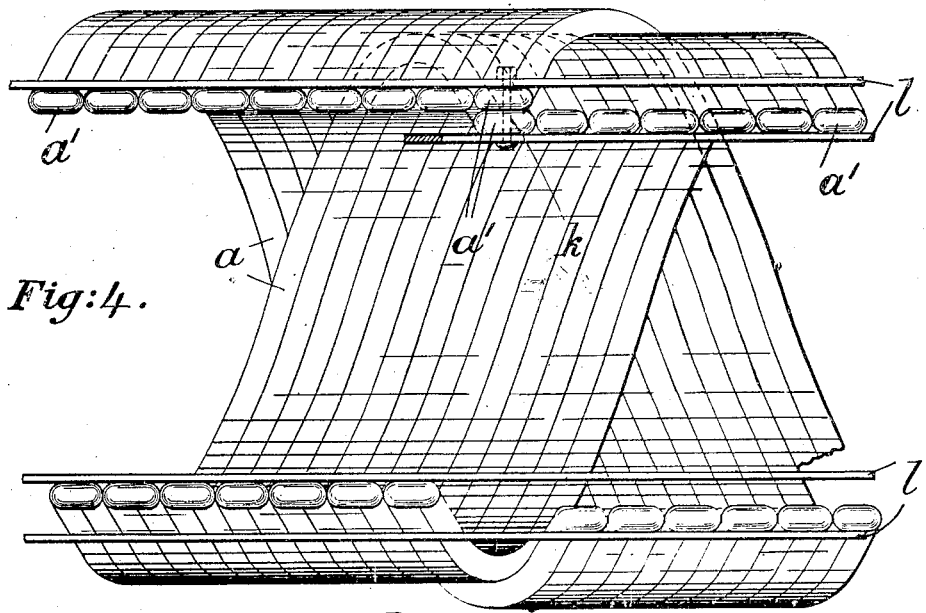
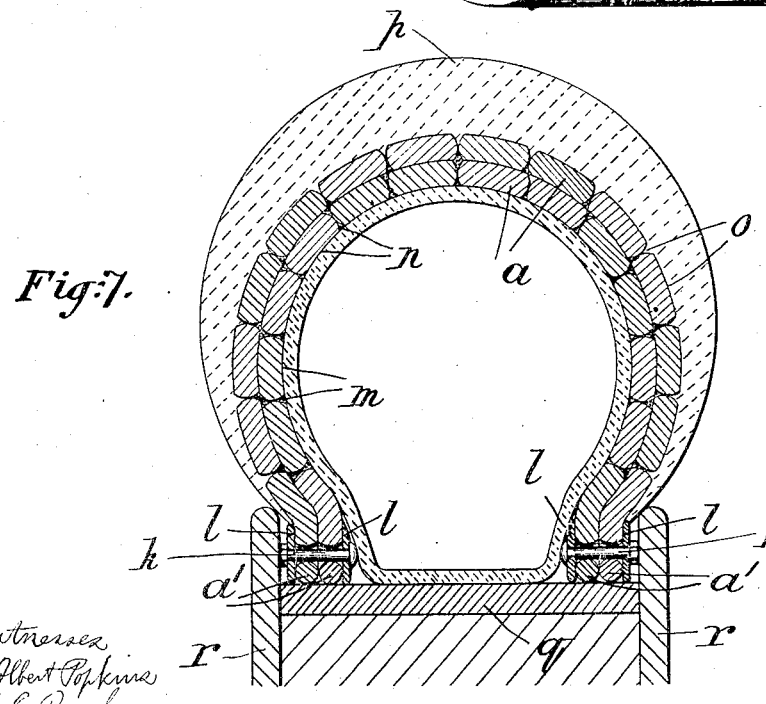
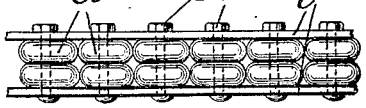

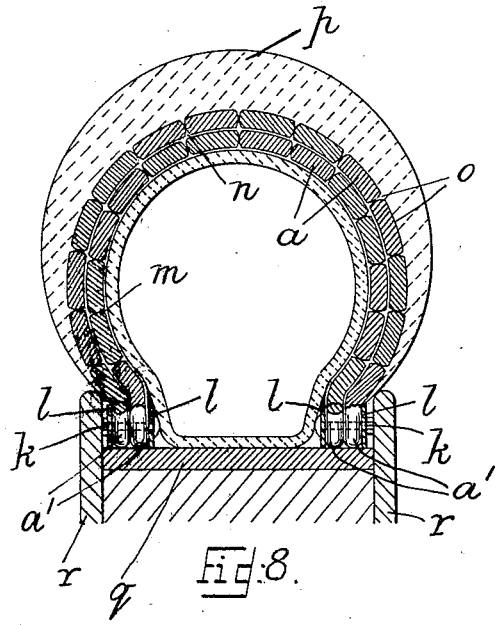
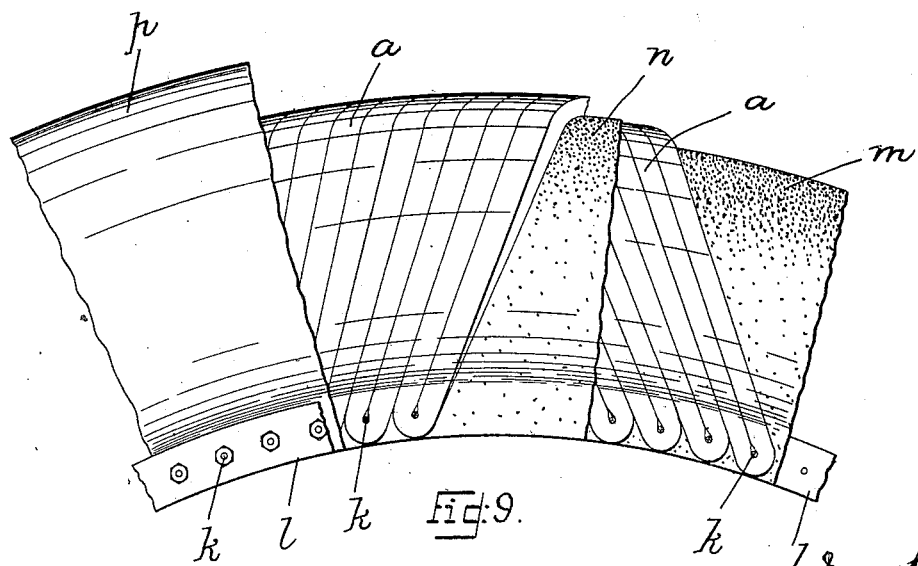

UNITED STATES PATENT OFFICE.

ALEXANDER LATIMER, OF LONDON, ENGLAND.

PNEUMATIC TIRE.

943,640.

Specification of Letters Patent. Patented Dec. 14, 1909.

Application filed June 8, 1907. Serial No. 377,883.

*To all whom it may concern:*

Be it known that I, ALEXANDER LATIMER, a subject of the King of Great Britain and Ireland, and residing at London, England, have invented a new and useful Improvement in Pneumatic Tires, for which I have filed applications for patents in Great Britain, No. 23,138, dated October 19, 1906, and No. 11,838, dated May 21, 1907; and I do hereby declare the following to be a full, clear, and exact description of the same.

This invention relates to covers for pneumatic tires for motor omnibuses and other heavy road vehicles, and has for its object to provide a tire cover the foundation fabric of which can, when badly damaged by puncture or cut, have the damaged part readily removed and renewed, so as to render the tire cover good for use again, without affecting the anchorages of the adjacent parts of the fabric.

To this end, the invention consists in constructing the foundation fabric of the cover of short lengths of looped rubbered cords of textile material laid, stretched, and compressed side by side, each such cord length being long enough to extend once across the cover at right angles or obliquely thereto as may be required, and having a loop at each end and being secured at each of its loop ends to the means of securing it to the wheel rim so that it can be separately removed and replaced independently of the cord lengths side by side therewith.

The looped cord lengths may be entire between their looped ends and made as short lengths of single cord provided with an opening or aperture at each end or, they may be made as endless cords doubled together so as to form a loop at each end, and may have their parts between their looped ends separate and unconnected or sewn or otherwise connected together.

The foundation fabric may be composed of a layer of such unit cord lengths stretched side by side and having the loop at each end of each unit cord length separately secured by a pin or bolt between metal disk rings or by hooks or other suitable means to wires, bands, or beads for securing the cover to a wheel rim, or of superposed layers of such unit cord lengths having their respective loop ends superposed and secured by such means.

On the accompanying drawings, which are diagrammatic representations:—Figure 1, represents a single cord length provided with an opening or aperture at each end. Fig. 2, represents a double looped endless cord length. Fig. 3, represents a fabric composed of a layer of such endless unit cords placed obliquely and held at their loop ends by pins and metal disk rings. Fig. 4, represents an inner view of a fabric composed of two layers of such endless unit cords, the cords of one layer being laid so as to cross the cords of the other layer and the cords of the two layers being held at their superposed loop ends by pins and disk rings. Fig. 5, represents the arrangement of cords forming the two layers shown in Fig. 4, showing the same as distended in the flat. Fig. 6, represents a view of the edges of the two fabric layers represented in Fig. 4, and of the means for separately securing the looped ends of the cord lengths; and Fig. 7, is a cross section of a tire cover fitted to a wheel rim. Fig. 8 is another view showing a cross section of a tire cover fitted to the wheel rim. Fig. 9 is a side elevation of a tire with parts broken away to reveal details of construction.

$a$, represents a unit cord length such as herein referred to having a loop, $a^1$, at each end and made of a length sufficient only to cross the cover once from edge to edge and to form a loop at each edge. In constructing the improved fabric, such unit cord lengths are stretched and compressed side by side across the circumference of a cover former so that the loop ends, $a^1$, of the constituent cord lengths are located at the edges of the cover, (Fig. 3) at which they are separately secured by suitable means, such, for example, as by pins or bolts, $k$, engaging with metal disk rings, $l$. Another layer or other layers of said unit cord lengths may be superposed upon the under layer so that their loop ends are also located at the edges of the cover and in superposed relation to the loop ends of the under layer, (Fig. 4) and secured as aforesaid, (Fig. 6). This construction permits of the constituent cord lengths of the fabric being separately detached, without affecting the anchorages of the adjacent cord lengths to the means used for securing the cover to the wheel rim, so as to permit of the cord units at a damaged part of the cover being removed and of new cord units being fitted in their place. A coating of rubber $m$, is provided on the inside of the fabric, and a coating of rubber, $n$, is provided between the layers, if more than one. The fabric is also covered, as at $o$, with rubber, which is vulcanized to the cord formation, and may also be formed as or provided with a tread, $p$, of any required formation.

In Fig. 7, $q$, represents a wheel rim having removable flanges, $r$, adapted to locate the tire cover so as to enable it to be readily removed.

What I do claim as my invention and desire to secure by Letters-Patent is:—

1. A pneumatic tire cover comprising a foundation fabric composed of rubbered cord-units each formed with a closed loop at each end and extending once across the cover, the cord-units being arranged side by side in one or more layers, inextensible rings at the edges of the cover, and removable pins or bolts passing through and anchoring the respective loops to the respective rings so that any cord-unit damaged by puncture or otherwise can be removed and replaced without disturbing the anchorages or tension of adjacent cord-units, substantially as set forth.

2. A pneumatic tire cover comprising a foundation fabric composed of rubbered cord-units each having a closed loop at each end and extending once across the cover, the cord-units being arranged side by side in one or more layers, a pair of inextensible metal disk rings at each edge of the cover, the rings of each pair engaging between them one loop of each cord-unit, and removable pins or bolts and coacting nuts uniting the rings of each pair and passing through and independently anchoring the loops therebetween so that any cord-unit damaged by puncture or otherwise can be removed and replaced without disturbing the anchorages or tension of adjacent cord-units, substantially as set forth.

In witness whereof I have hereunto set my hand in presence of two witnesses.

ALEXANDER LATIMER.

Witnesses:
CHARLES AUBREY DAY,
ALFRED DAY.